United States Patent
Winters, Jr.

(10) Patent No.: US 12,398,743 B1
(45) Date of Patent: Aug. 26, 2025

(54) SYSTEM OF TUBULAR CONNECTIONS

(71) Applicant: Douglas E. Winters, Jr., Gilbert, SC (US)

(72) Inventor: Douglas E. Winters, Jr., Gilbert, SC (US)

( * ) Notice: Subject to any disclaimer, the term of this patent is extended or adjusted under 35 U.S.C. 154(b) by 582 days.

(21) Appl. No.: 17/683,735

(22) Filed: Mar. 1, 2022

Related U.S. Application Data

(60) Provisional application No. 63/162,666, filed on Mar. 18, 2021.

(51) Int. Cl.
| | |
|---|---|
| *F16B 7/18* | (2006.01) |
| *F16B 7/04* | (2006.01) |

(52) U.S. Cl.
CPC ............ *F16B 7/182* (2013.01); *F16B 7/0413* (2013.01); *F16B 7/185* (2013.01)

(58) Field of Classification Search
CPC ............. F16B 7/18; F16B 7/182; F16B 7/185
See application file for complete search history.

(56) References Cited

U.S. PATENT DOCUMENTS

| | | | | |
|---|---|---|---|---|
| 10,780,751 | B2 * | 9/2020 | Sartin ..................... | F16B 33/02 |
| 2003/0165353 | A1 * | 9/2003 | Clausell ................... | E04B 1/19 |
| | | | | 403/56 |
| 2013/0255064 | A1 * | 10/2013 | McMahon .............. | F16L 3/133 |
| | | | | 403/187 |
| 2020/0109815 | A1 * | 4/2020 | Wilson ................. | F16M 13/022 |

FOREIGN PATENT DOCUMENTS

| | | | | |
|---|---|---|---|---|
| CH | 215903 | A * | 7/1941 | |
| CH | 431196 | A * | 2/1967 | |
| CH | 715382 | A1 * | 3/2020 | |
| DE | 3815331 | A1 * | 11/1989 | |
| DE | 10038626 | A1 * | 2/2001 | .......... E04F 11/1834 |
| DE | 102015015682 | A1 * | 7/2016 | |
| DE | 102017003973 | A1 * | 10/2018 | |
| DE | 202019102022 | U1 * | 5/2019 | |
| DE | 102019135705 | A1 * | 6/2021 | |
| FR | 1594365 | A * | 6/1967 | |
| FR | 1518329 | A * | 3/1968 | |
| FR | 1544190 | A * | 10/1968 | |
| FR | 2606098 | A1 * | 5/1988 | |
| GB | 2185798 | A * | 7/1987 | .......... E04F 11/1804 |

* cited by examiner

*Primary Examiner* — Jonathan P Masinick
(74) *Attorney, Agent, or Firm* — Melissa B. Neely

(57) ABSTRACT

The System of Tubular Connections (STC) is a building method for constructing and fastening together any elongated symmetrical frameworks such as awning or fences, eliminating the need for other fastening methods such as welding. The STC consists of 4 basic physical elements. Element 1 is any elongated symmetrical shape, for example tubing or 2×4 wooden boards. Element 2 is any threaded product. Element 3 is a tubing fastener used when Element 1 is symmetrical hollow tubing. Element 4 is the building block that the elongated symmetrical shape is screwed into or through.

1 Claim, 22 Drawing Sheets

SYSTEM OF TUBULAR CONNECTIONS

STATEMENT REGARDING FEDERALLY SPONSORED RESEARCH OR DEVELOPMENT

This invention was not made by an agency of the United States Government nor under a contract with an agency of the United States Government.

CROSS REFERENCE TO RELATED APPLICATIONS

Provisional Patent Application Number: 63/162,666
Filing Date: Mar. 18, 2021
Relationship: The provisional application was for the same invention.

THE NAME OF THE PARTIES TO JOINT RESEARCH AGREEMENT

Not Applicable.

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable

BACKGROUND OF THE INVENTION

Field of the Invention

The inventor/applicant has worked in welding, fabrication, and the construction of canvas awning frames for 35 years. He has spent many hours designing, developing, testing, and evaluating the process for connecting pieces of awning frames together. The inventor was constantly faced with the challenge of creating consistently high-quality frames in a time efficient manner that could be easily transported to a customer's location.

Another challenge he faced with the current process for constructing awning frameworks is the welding is required to connect the framework together, which is a tedious and time-consuming task. Additionally, the end product of framework structures can be quite large and heavy, requiring large equipment to transport them to the customer. The invention disclosed in this application, The System of Tubular Connections (STC), solves these challenges by facilitating the fabricator's ability to build the framework structure onsite because the connection pieces (Elements) are lightweight and portable. This system significantly reduces the amount of time and complexity required to fabricate the framework.

Description of Related Art

A number of US patents and patent applications describe mechanisms for the connection of two pieces of pipe together, among the US Patent Application Publication 2016040812, U.S. Pat. No. 8,074,420, US Patent Application Publication 2011001315, U.S. Pat. Nos. 7,708,317, 7,530,606, and 6,164,706. The present invention differs from the prior art in that it discloses an overall system for building awnings and like structures.

BRIEF SUMMARY OF THE INVENTION

The inventor conceived of the idea for the STC as an alternative process for constructing canvas awning frames. He began recording and documenting his ideas and illustrations to depict this concept. Over time, the inventor refined his ideas into a new process to construct awning frameworks for which a patent is desired. Additionally, the inventor believes the STC may have much broader applications for joining framework structures beyond awnings.

The initial concept he developed uses two separate connecting round tubes, the smaller sliding into the larger to form an interior sleeve. Later, he combined the tubes with threaded components to securely fasten them together so they can be attached and through other materials. This combination of components that affixes the Tubing Fastener into and through a solid material allows a ¾" electric metallic tube (EMT) conduit pipe to slide around the fastener; this prototype is referred to as "Connector Piece Number One" (FIG. 4).

The connection process described in the paragraph above led to the concept of "Tubing Fasteners" which can be used to connect any symmetrically shaped tubing regardless of size. "Tubing Fasteners" which is Element 3 of the invention is illustrated in the Figures.

BRIEF DESCRIPTION OF THE SEVERAL VIEWS OF THE DRAWING

FIG. 1*a* is an illustration of several examples of symmetrical shapes that have a geometrically designed axial center that could be used in the construction of frames, for example awnings. The dot in the center of each geometric shape represents their geometrically defined axial centers. FIG. 1*b* is an illustration of two connecting round tubes that telescope and fit snugly together.

FIG. 5*a* shows the tubing fastener (80) with a section of tubing (100) to be connected. FIG. 5*b* is a cross section of a tubing fastener without the threaded element; the interior of the tubing fastener should be the same size as the threaded element to be inserted. FIG. 5*c* is a fully threaded tube fastener.

FIG. 10 shows straight and curved tubing (100, 103), a threaded screw (104) and Tubing Fasteners (80).

FIG. 18 also shows the alternative Tube Slide means of connection, where the ends (221) of the building bock 220 are sized to slide into the square tubing (110).

DETAILED DESCRIPTION OF THE INVENTION

The System of Tubular Connections (STC) is a building method for constructing and fastening together any elongated symmetrical frameworks such as awning or fences, eliminating the need for other fastening methods such as welding. The STC consists of 4 basic physical elements. Element 1 is any elongated symmetrical shape, for example tubing or 2×4 wooden boards. Element 2 is any threaded product. Element 3 is a tubing fastener used when Element 1 is symmetrical hollow tubing. Element 4 is the building block that the elongated symmetrical shape is screwed into or through.

Figure 13:
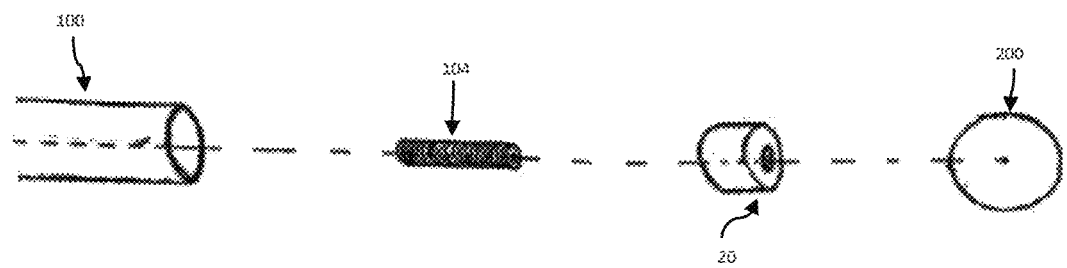
FIG. 13 illustrates the four elements of the STC process with examples showing how they connect sequentially and maintain parallel juxtaposition to the line projected through their parallel center of symmetry. Element 1 is any solid or hollow elongated symmetrical shape, for purposes of illustration round tubing (100) is shown. Element 2 (104) is a threaded product, typically some type of screw. Tubing Fasteners (20) makeup Element 3. Element 4 are Building Blocks (200) which can be any solid or hollow shape and is screwed into or through a parallel axial line projected from its center of symmetry.

FIG. 13 illustrates the four elements of the STC process with examples showing how they connect sequentially and maintain parallel juxtaposition to the line projected through their parallel center of symmetry. Element 1 is any solid or hollow elongated symmetrical shape, in FIG. 13 this is represented by hollow round tubing (100). Element 2 (104) is a corresponding threaded component that screws into or through the tubing. Element 3 (20) is a Tubing Fastener, which can be designed to join any size symmetrically shaped tubing to a desired surface. Element 4 (200) is comprised of Building Blocks, which can be any solid or hollow shape and is screwed into or through a parallel axial line projected from its center of symmetry.

Figure 1A:
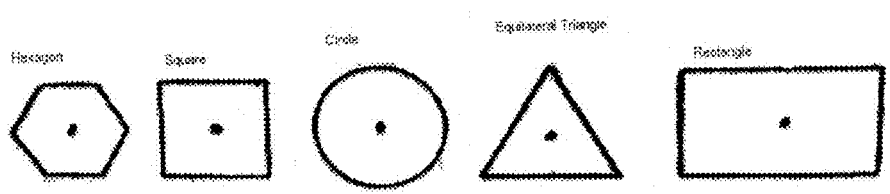
FIGS. 1*a* and 1*b* are background information.
Figure 1B:
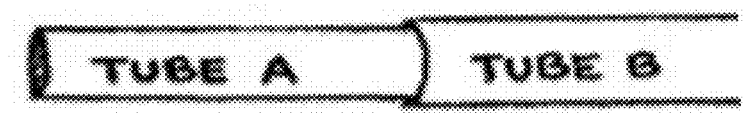
Figure 2:
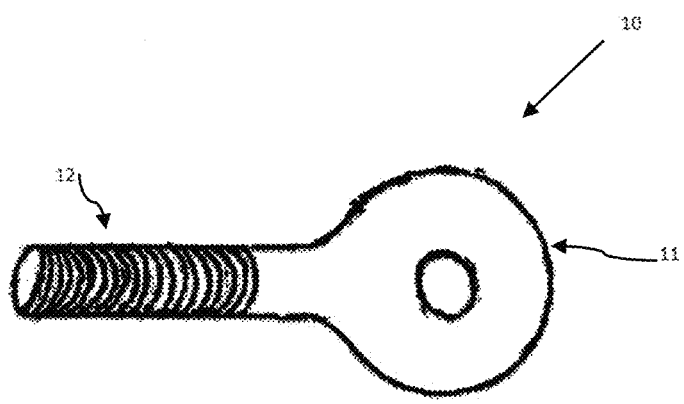
FIG. 2 is an illustration of the Pivoting Axial Screw (10) designed to pivot when building trusses. The head (11) of the screw is a flat connecting surface where the horizontal distance of the head (11) is smaller than the surface of the connecting hole in the truss.
Figure 3:
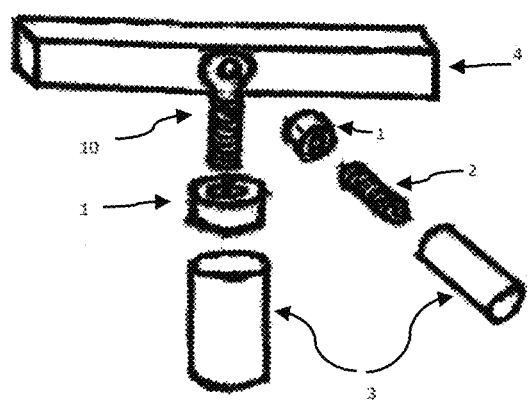
FIG. 3 is an illustration of the Pivoting Axial Screw (10) connecting building elements to a truss (4). The head (11) of Pivoting Axial Screw (10) is affixed to the truss (4) using a tubing fastener (1) and a threaded rod (2) further connected to a symmetrical tube (3). A second tubing fastener (1) and symmetrical tube can be connected to the threaded end (12) of the Pivoting Axial Screw (10).

Element 1 of the design process is any elongated symmetrically shaped material, hollow or solid, intended for use in the construction of structural frameworks such as awnings. The materials used to create Element 1 can be composed of, but not limited to: wood, metal, or plastic tubing depending on the desired structural strength. If Element 1 is a solid material, then Element 3 is not needed. FIG. 1a shows several examples of elongated symmetrical shapes that have a geometrically defined axial center. FIG. 1b shows two round tubes, the smaller of which slides snugly into the larger.

Element 2 is any threaded product intended to fasten Element 1 into and through other materials to connect the tubing or solid symmetrical components together or to connect into and through other materials to secure the framework. A variety of sizes for the threaded product can be used such as threaded rods of various sizes, 5/16" to 1-inch screws and bolts and their corresponding fastener applications such as lag shield and anchors.

A unique concept for a threaded product that would be suitable for several applications within the STC is the Pivoting Axial Screw (10). The Pivoting Axial Screw (10) has a unique shape akin to a flat washer with an attached threaded screw shaft (12). The flat screw head (11) can be laid flat against any desired surface and affixed by inserting a large headed nail or screwing an appropriate screw through the center hole of the screw head (11) into the desired surface until tight. The flat screw head (11) allows the Pivoting Axial Screw (10) to pivot the shaft from side to side anywhere along the screw head's (11) plane of rotation before it runs into the edges of the surface it is being attached to. The screw head (11) must be smaller than the surface it is attached to; it should not protrude past the edge of the surface. The threaded shaft (12) can be screwed into or through a Tubing Fastener or any appropriate female threaded opening.

Figure 4:
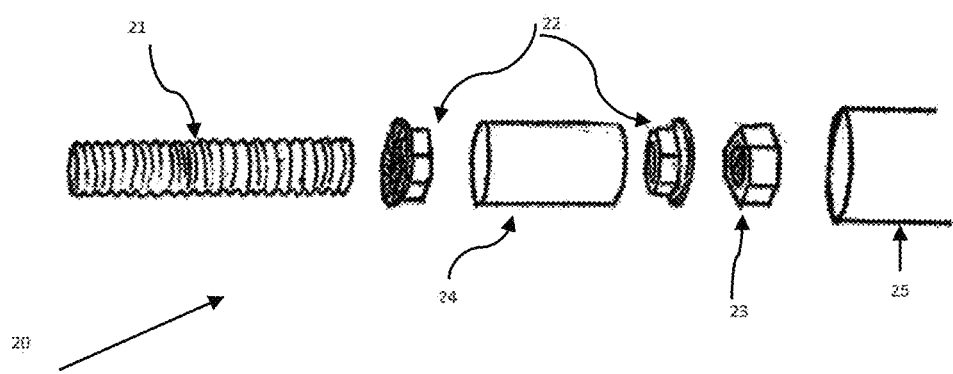
FIG. 4 is an illustration of Connector Piece Number One (20) connected to a piece of conduit pipe (25). The elements comprising Connector Piece Number One (20) are a threaded rod (21), two threaded hex-head serrated flange nuts (22), a piece of tubing (24), and a threaded hex-head nut (23).
Figure 5A:
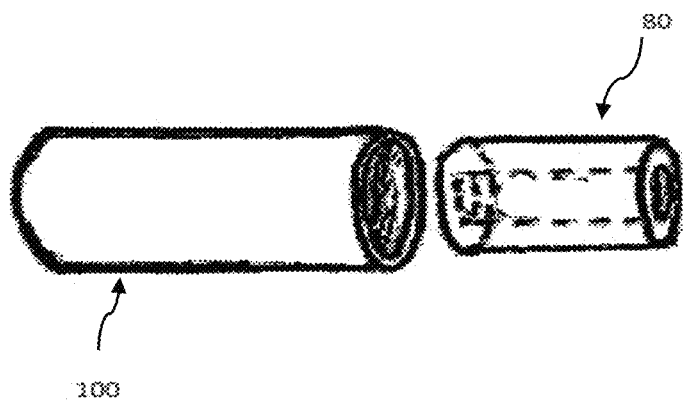
FIGS. 5*a* through 5*c* are illustrations of general Tubing Fasteners (80).
Figure 5B:
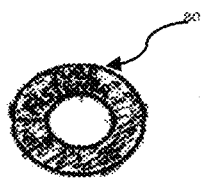
Figure 5C:
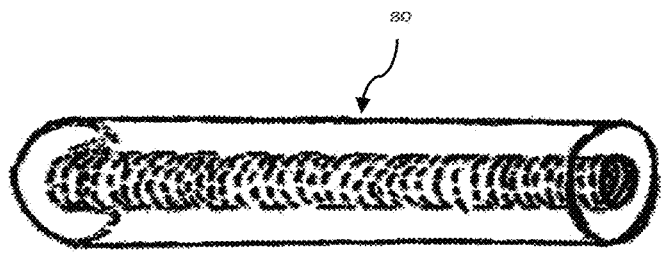

The concept that led to the discovery of tubing fasteners is Connector Piece Number One (20) shown in FIG. 4. Connector Piece Number One consists of several components screwed together to snugly fit into a symmetrically shaped tube to securely fasten a smaller tube to a larger, that can be joined into and through other materials such as Building Blocks (Element 4). FIG. 4 demonstrates an example of Connector Piece Number One (20) connecting to a ¾" piece of electrical tubing (25). More precisely, the example electrical tubing (25) has an approximate inside diameter of 13/16" and approximate outside diameter of 15/16". The second piece of tubing (24) is a ½ inch pipe with an outside diameter of 0.85 inches with a 15 gauge wall thickness. Element 2 (21) in FIG. 4 is a ⅜" coarse threaded rod. Pieces numbered 22 are ⅜" coarse threaded hex-head serrated flange nuts. Piece number 23 is a standard coarse threaded hex-head nut.

Element 3 is a connection concept called Tubing Fasteners. A Tubing Fastener securely joins Element 1 and Element 2 together in a way that lines them up in a parallel sequence to the line projected through their axial center. The Tubing Fasteners' design is based on the interior shape of the tubing used in the structure frame.

The exterior dimension of the tubing fasteners is dependent upon the size and shape of the interior of the symmetrical tubing. The outer diameter is slightly smaller than the interior diameter of the tubing (Element 1). This allows for the fastener tubing to fit snugly inside the symmetrical tubing.

The shape of the Tubing Fastener's interior opening is determined based on the size of Element 2, and it can be either smooth or threaded. Element 2 will screw through the axial center of the tubing fastener and into or through any desired surface. Tubing fasteners can be secured to their corresponding tubing by being glued in, riveted, or screwed into. Tubing fasteners are illustrated in FIGS. 5a, 5b, 5c, 6, 7a, 7b, 8a, 8b, 9a, and 9b; these examples illustrate tubing fasteners for round tubing. FIGS. 9a and 9b illustrate that a Tubing Fastener's (90) interior opening can be either threaded or smooth.

Figure 6:
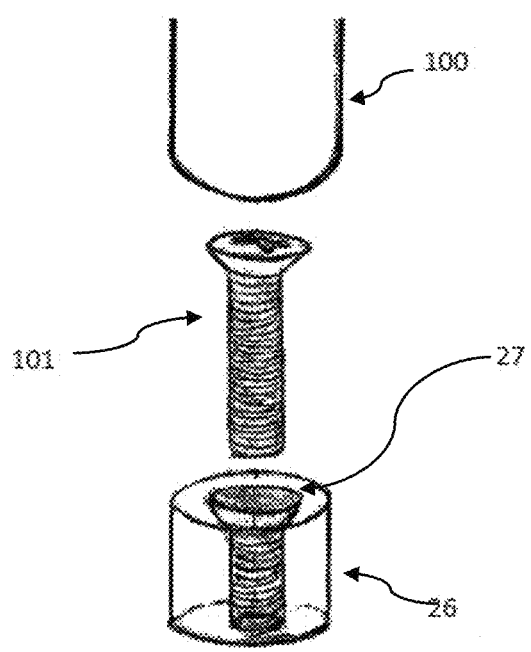
FIG. 6 shows the design for Tubing Fastener A (26), which has hole running through its axial center with a concave recessed funnel-shaped opening on one end called a Screw Stop (27) to provide a tight fit for a screw (101) with an angled head. The portion of the hole that accommodates the screw's shaft can be threaded or smooth.

Tubing Fastener A (26) is illustrated in FIG. 6. Tubing Fastener A (26) has a hole that runs through its axial center. One side of the hole has a concave recessed funnel-shaped opening (27) that precisely accommodates the angle of slope of a corresponding screw's head and then a subsequent cylindrical portion that corresponds to the width of the screw's shaft and can be smooth or threaded. The function of the funnel-shaped opening (27) is to create a stop for the screw (101) to be securely fastened. In addition, this would enable the surface of the screw's (101) head to be flush with the surface of the fastener (26). This funnel and cylinder-shaped hole is called the Screw Stop (27). The fastener (26) is screwed through its axial center to be affixed to the desired surface. The tubing (100) then slides snugly over the fastener (26) to directly touch the desired surface. In the example shown in FIG. 6, the Screw Stop's (27) funnel area is sloped at an angle of 82 degrees to accommodate the corresponding fastening screw (101), which in this example is a flat head machine screw.

Figure 7A:
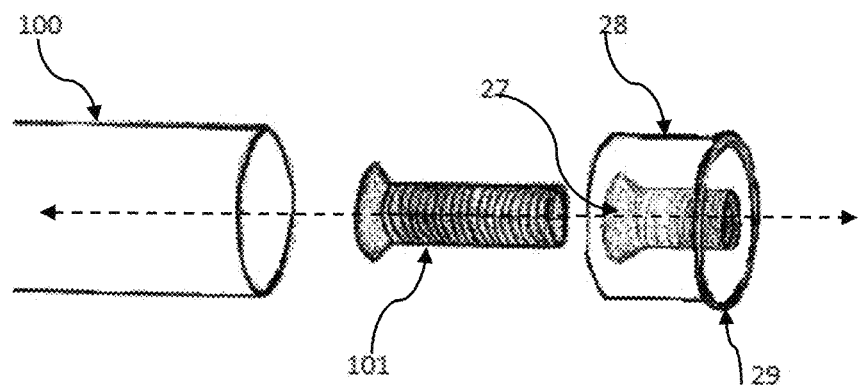
FIGS. 7a and 7b depicts Tubing Fastener B1 (28) which is similar to Tubing Fastener A (26) but differs in that Tubing Fastener B1 (28) has a lip (29) extending from the edge on the side opposite to the Screw Stop (27) side. The lip (29) acts as a stop when the fastener slides into tubing (100).
Figure 7B:
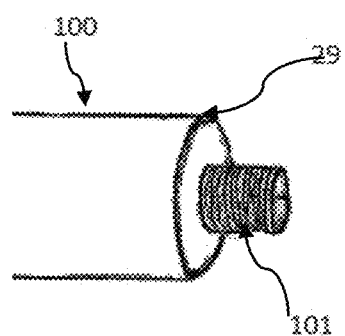

Tubing Fasteners B1 (28) and B2 (30) resemble Tubing Fastener A (26), except that they have an attached lip (29). The lip (29) extends beyond the exterior side of the Tubing Fastener. The lip (29) is sized so that it will not fit inside the tubing used for Element 1. Tubing Fastener B1 (28) is illustrated in FIGS. 7a and 7b. Tubing Fastener B2 (30) is illustrated in FIGS. 8a and 8b.

Tubing Fastener B1 (28), has a Screw Stop (27) on the end opposite to the side with the lip (29). Tubing Fastener B2 (30) can be threaded or non-threaded. When threaded. Tubing Fastener B2 (30), simply has a threaded cylindrical shaped hole running through its center. The tubing slides snugly over the fastener until the lip (29) acts as a stop abutting the end of the tubing. The lip's (29) diameter corresponds to the outer diameter of the tubing.

To render Tubing Fastener B1 (28) ready for affixing to a surface, the affixing screw (101) is screwed through the fastener's Screw Stop (27) side until the screw's head stops. The tubing (100) can then slide over the Screw Stop (27) side of the fastener (28) until it stops at the fastener's lip (29). A significant portion of the screw's (101) threaded shaft will protrude through the fastener's lip side, ready to be secured to a desired surface.

Figure 8A:
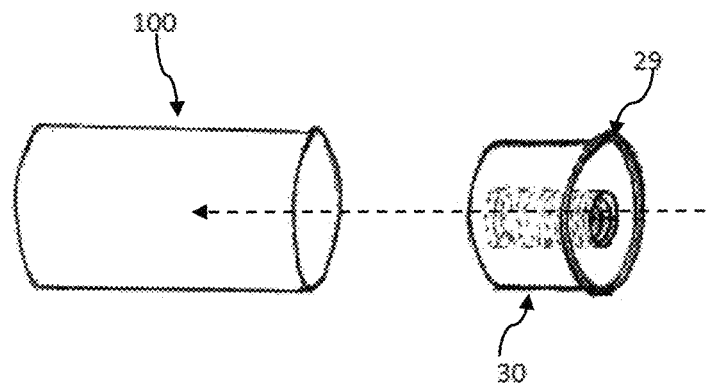
FIGS. 8a and 8b depicts Tubing Fastener B2 (30) which is similar to Tubing Fastener B1 (28) in that it has a lip (29) extending from the edge on one side, but unlike Tubing Fastener A (26) and Tubing Fastener B1 (28), Tubing Fastener B2 (30) has no Screw Stop (27).
Figure 8B:
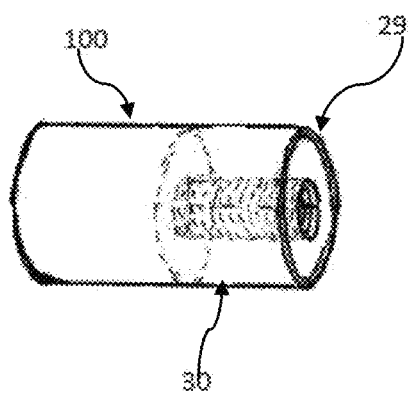
Figure 9A:
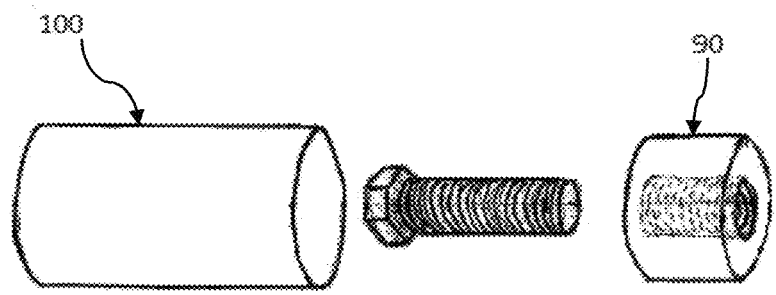
FIGS. 9a and 9b illustrate a Tubing Fastener with a threaded interior hole (90) and a Tubing Fastener with a non-threaded interior hole (91).
Figure 9B:
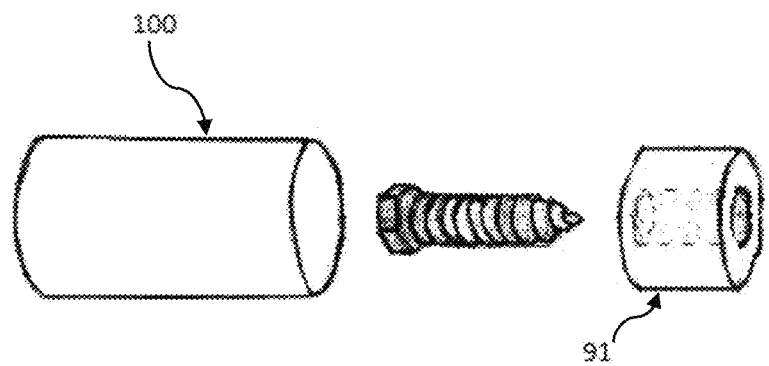
Figure 10:
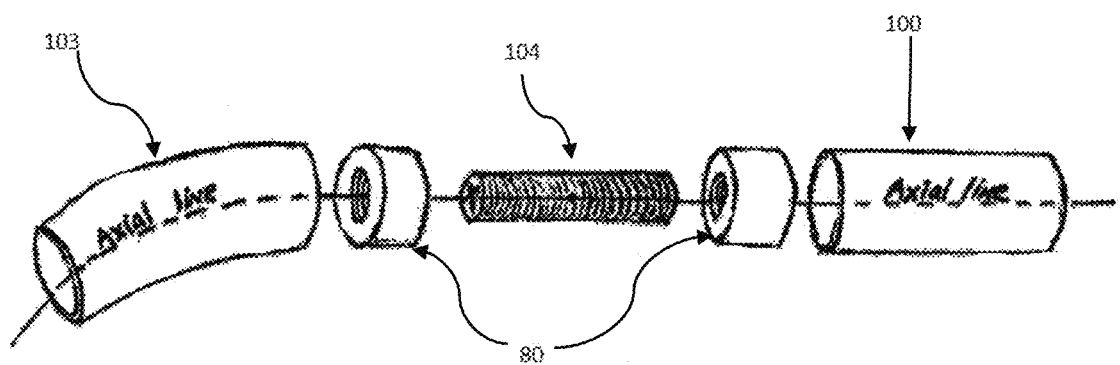
FIG. 10 is an illustration of the proposed patent's postulate that only "one" parallel threaded screw is screwed into or through the center of symmetry rotated, projected, and connected as either one straight or any curved, elongated symmetrical shape. For illustration purposes.

As illustrated in FIGS. 8a and 8b, Tubing Fastener B2 (30) is inserted into the desired tubing (100) until it stops at the lip (29). Then the female portion of the combined fastener/tubing can be screwed into by a corresponding threaded male component to affix it to any desired surface. Tubing Fastener B2 can be screwed into and through from either end.

Figure 11:
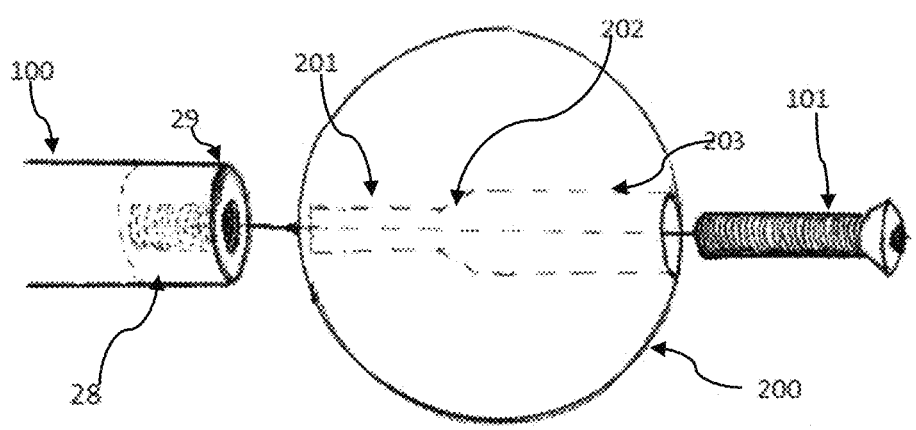
FIG. 11 demonstrates the concept of the Screw Stop of Tubing Fastener B1 (28) being applied to a Building Block (200); the Screw Stop in this drawing has a funnel-shaped area that transitions from the larger portion of the interior hole to the smaller.
Figure 12:
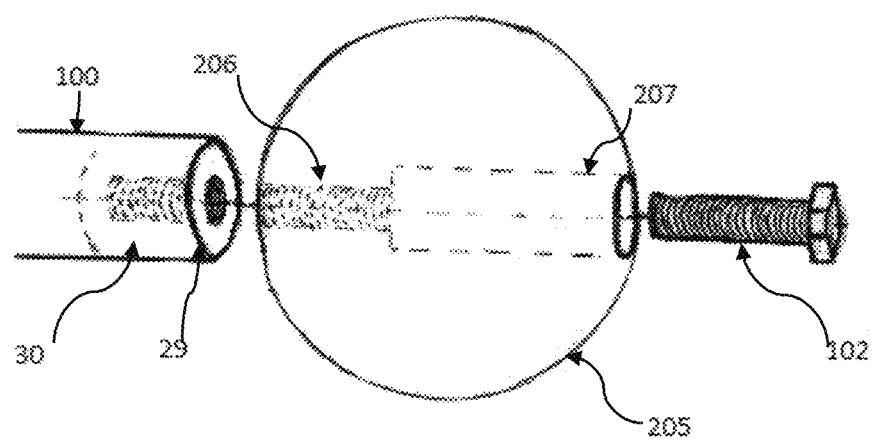
FIG. 12 also demonstrates a Screw Stop within a Building Block (205), but with a flat surface at the end of the larger portion of the interior hole.

Element 4 is referred to as Building Blocks and are used to join and secure the other three Elements into and through one another and into other structures. Building Blocks can be any solid or hollow shape that forms an intersection between the elements from which the structure can support angles to create the desired shape of the framework. Examples of Element 4 (200, 205) are illustrated in FIGS. 11 and 12. Building Blocks will vary in size and material depending on the desired size, strength, and composition of the structure.

Figure 14A:
FIGS. 14a through 14c illustrates the concept that connection between two Building Blocks (200) may be a parallel straight or any curved parallel elongated symmetrical shape.
Figure 14B:
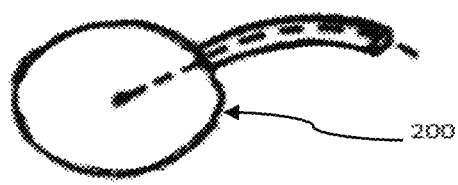
Figure 14C:
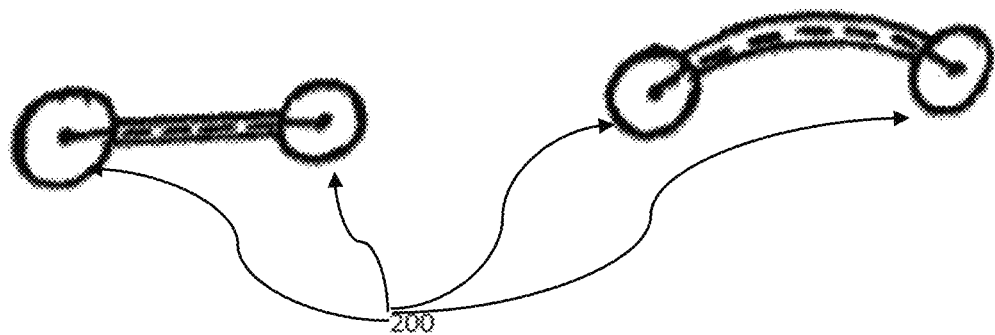
Figure 15:
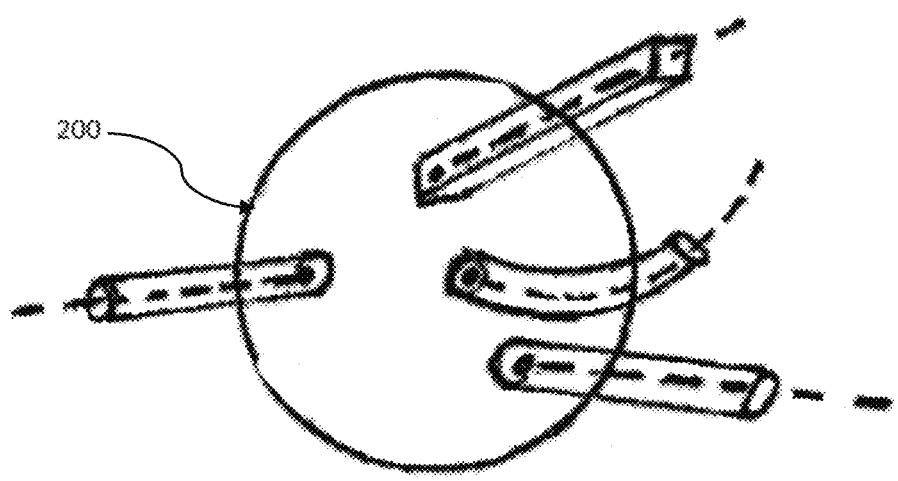
FIG. 15 illustrates that Building Blocks (200) can have several different projected centers of symmetry within the same Building Block.

When using Building Blocks, the four elements are always screwed into or through the parallel axial center of symmetry, projecting and connecting only one straight or any curved parallel elongated symmetrical shape, as illustrated in FIGS. 14a through 14c. The four elements are always screwed together parallel to the line projected through the axial center. Only one parallel axial line is drawn through the center of all elongated symmetrical shapes. Building Blocks used with the other three Elements represent a three-dimensional model of Euclid's main postulate (only one line may be drawn through a given point parallel to a given line). All points within a given Building Block can be the projected center of symmetry as illustrated in FIGS. 14a through 14c and FIG. 15.

The Screw Stop concept can also be used within Building Blocks to form a secure fastening with other surfaces as illustrated in FIGS. 11 and 12. The Screw Stop in Building Blocks (200, 205) consists of a hole that runs through its projected axial center that has larger opening leading to a smaller opening. The larger portion (203, 207) of the hole and the stop are smooth, while the smaller portion (201, 206) of the hole can be smooth or threaded. The diameter of the larger portion of the hole (203, 207) accommodates the diameter of the affixing screw's head, and the smaller portion of the hole (201, 206) accommodates the diameter of the screw's shaft. The screw (101, 102) is inserted into the larger hole (203, 207) and either screws or slides through the smaller portion (201, 206) of the hole until the transition between the larger and smaller sections prevents the screw's head from going further. It is desired that the threaded portion of the screw's (101, 102) shaft protrudes beyond the Building Block (200, 205) to fasten into or through another Element such as a Tubing Fastener (30).

In FIG. 11, the Building Block (200)'s center hole (201-203) has a funnel shaped area (202) linking the smaller (201) and larger (203) holes. The funnel-shaped section (202) is sloped at an angle that corresponds to the angle of the screw's (101) head.

Figure 18:
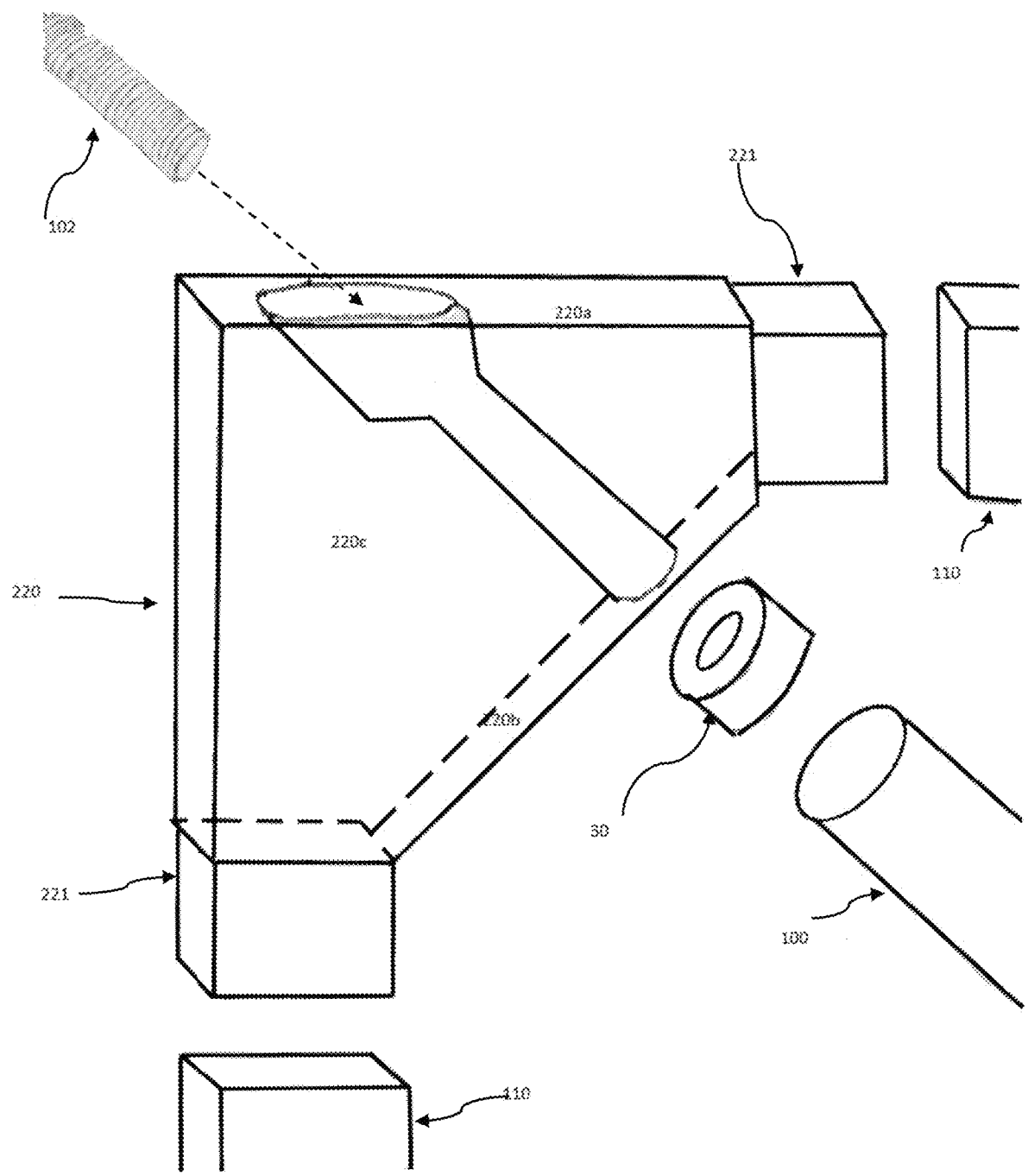
FIG. 18 illustrates the Truss in a Box-Truss Corner embodiment showing the connection of STC's 4 Elements; with the examples of round and square tubing (100, 110) for Element 1, a hex headed screw (102) for Element 2, a round Tubing Fastener (30) for Element 3, and a solid building block (220) for Element 4.
Figure 19:
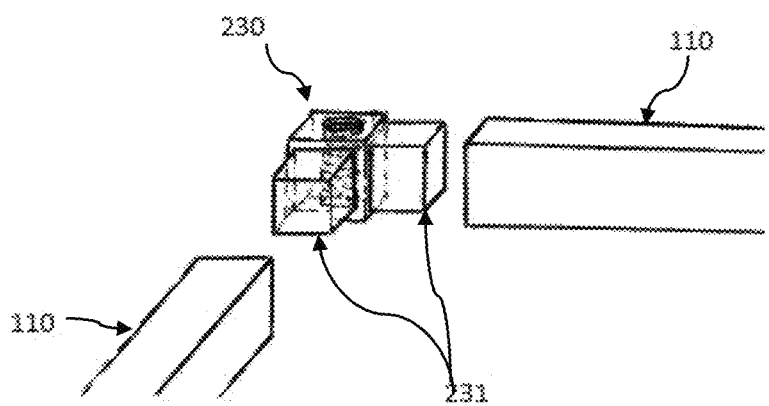
FIG. 19 illustrates the Truss In a Box-Corner Cube 2 embodiment showing square tubing (110) and a building block (230) with the alternative tube slides (231).
Figure 20:
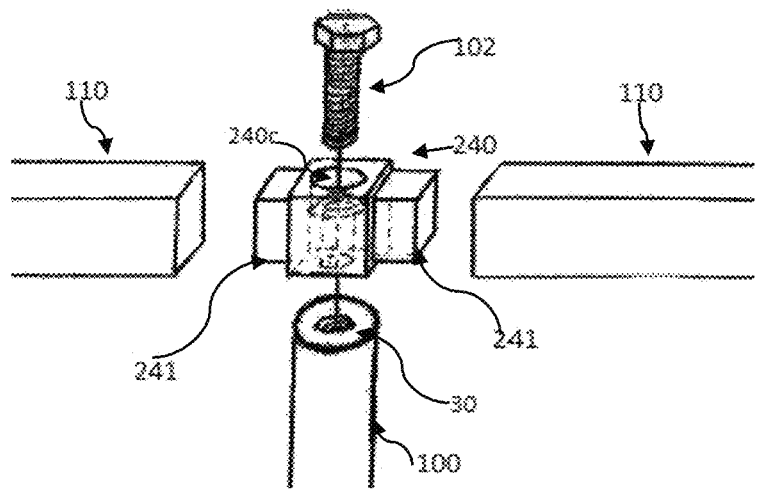
FIG. 20 illustrates the Truss In a Box-Cube End embodiment showing square tubing (110) and a building block (240) with the alternative tube slides (241).

Another connection method for Building Blocks is the Tube Slide. The Tube Slide is a design concept that simplifies and strengthens the connection between tubing and Building Blocks. Tube Slides are male appendages that are part of the Building Block's body and enable tubing to slide over and be attached, eliminating the need for Tubing Fasteners. In fact, a Tube Slide can be used anywhere Tubing would slide over an appendage or Tubing Fastener; the functional difference is that screws can be fastened into or through Building Blocks using Tubing Fasteners, but not Tube Slides. Tube Slides protrude from their Building Block at angles according to the desired shape of the structure. Corresponding tubing slides over these appendages much like it does for Tubing Fasteners, the tubing sliding snugly over the slightly smaller Tube Slide until the tubing abuts the main part of the Building Block. This reduces the number of components needed to form connections between Building Blocks and tubing. FIGS. 18 through 20 illustrate Building Blocks (220, 230, 240) with Tube Slide sections (221, 231, 241).

Figure 21:
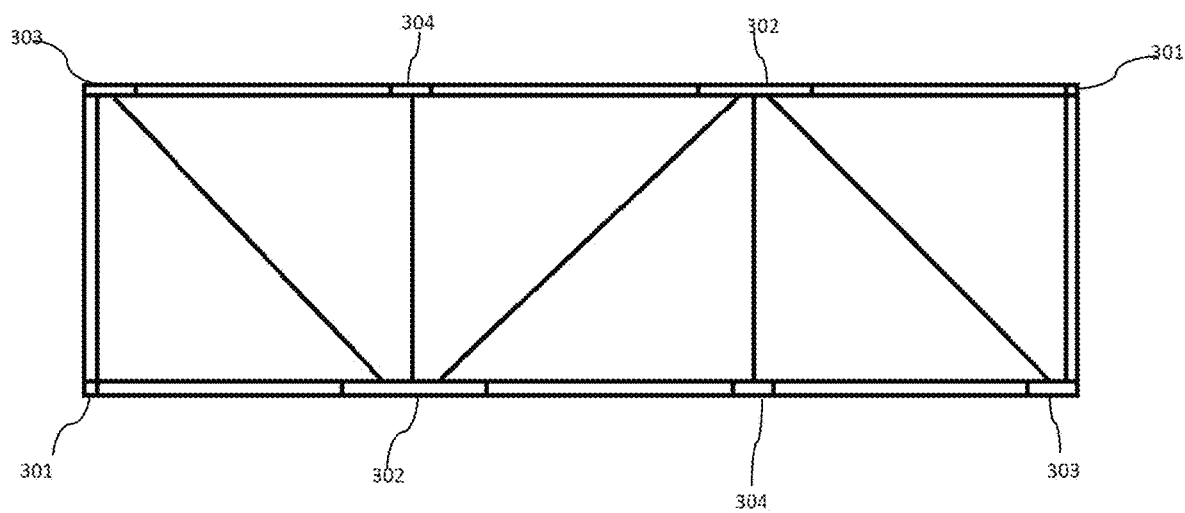
FIG. 21 illustrates an example of building of a truss with the various Truss In A Box components previously illustrated; such as FIG. 16 (301), FIG. 17 (302), FIG. 18 (303), and FIG. 20 (304).

An example embodiment of the STC is the Truss in a Box. The Truss in a Box includes a series of STC components that connect together to form a strong truss structure (FIG. 21). The example embodiment shows a truss using 1" square tubing.

Figure 16:
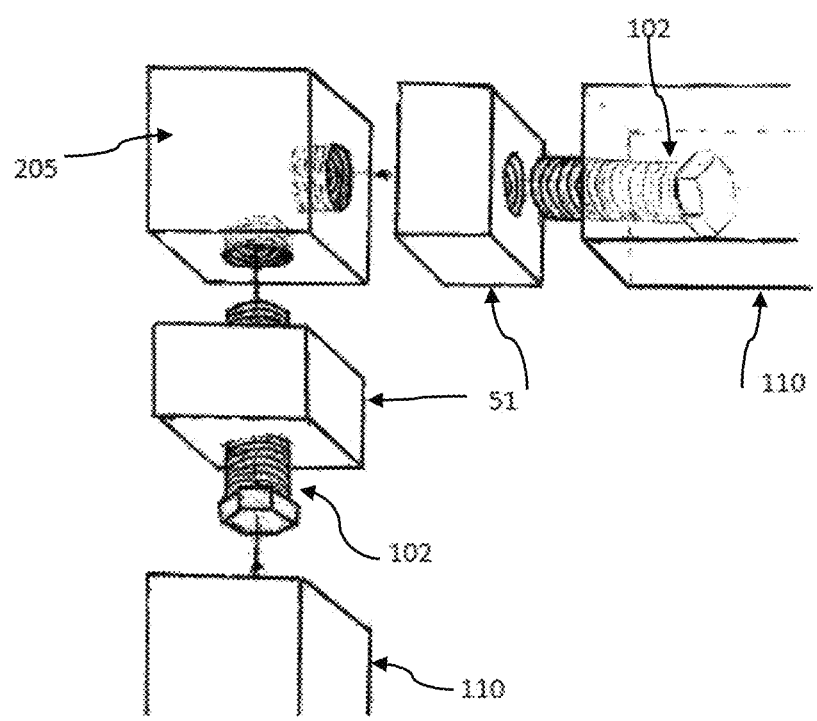
FIG. 16 illustrates the Truss in a Box-Corner Cube embodiment showing the connection of STC's 4 Elements; with the examples of square tubing (110) for Element 1, a hex headed screw (102) for Element 2, square Tubing Fasteners (51) for Element 3, and a cube (205) for Element 4.

One portion of the truss, the Corner Cube is illustrated in FIG. 16. The Corner Cube utilizes all 4 Elements. Element 1 is two square tubes (110). Element 2 is two hex-headed screws (102). Element 3 is two square Tubing Fasteners (51), where the Tubing Fasteners are sized to fit snugly inside the square tubes (110). The Building Block (205) of Element 4 has two threaded female openings on adjacent sides of the block to form a 90-degree angle connection.

An alternative Corner Cube is illustrated in FIG. 19. In this embodiment, the Building Block (230) is equipped with Tube Slides (231) which are inserted into the ends of square tubing (110).

Figure 17A:
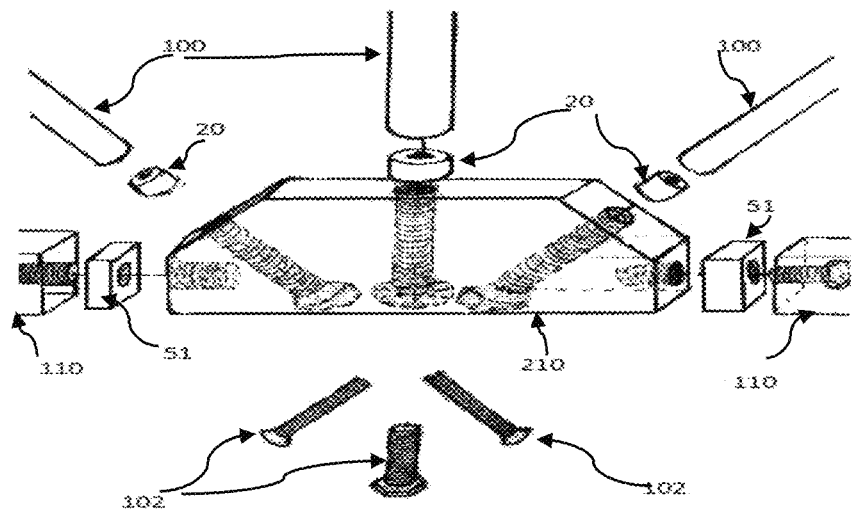
FIG. 17a illustrates the Truss in a Box-Center Cube embodiment showing the connection of STC's 4 Elements; with the examples of round and square tubing (100, 110) for Element 1, a hex headed screw (102) for Element 2, round and square Tubing Fasteners (20, 51) for Element 3, and a solid building block (210) for Element 4.
Figure 17B:
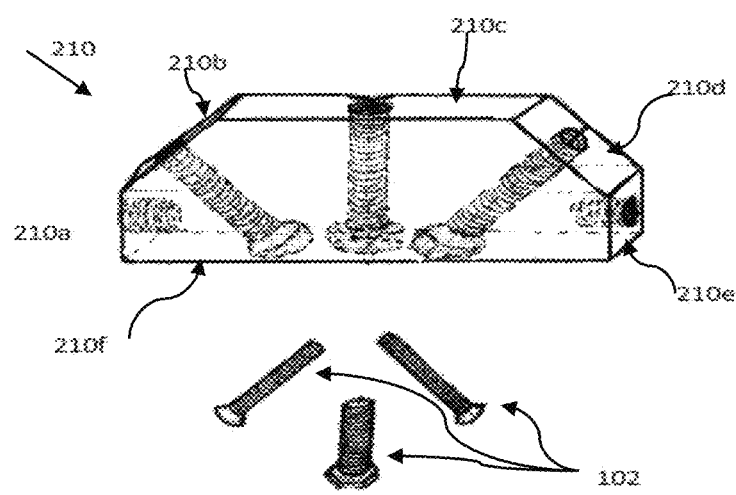
FIG. 17b is an example of Element 4 (210).

The Center Cube portion of the Truss in A Box is illustrated in FIGS. 17a and 17b. The Center Cube consists of a long Building Block (210) of Element 4, five Tubing Fasteners (20, 51) for Element 3, five sections of tubing (100, 110) for Element 1 and various screws (Element 2) for securing the components. The three Tubing Fasteners (20) and tubes (100) that are affixed to the central portion of the cube in this example are round and form the inner lattice of the truss structure.

The Building Block (210) of the Center Cube is shaped to best accommodate the desired angles of the tubing in the truss structure. It has a single threaded hole on 5 (210a-210e) of its 8 sides. The long narrow side (210f) has three threaded openings; the middle opening is a vertical threaded opening with a flat-surfaced Screw Stop. The two openings on either side of the middle opening are 45-degree angle threaded openings with funnel-shaped Screw Stops. An alternative version of this Building Block (210) would replace the flat ends and holes (210a and 210e) with Tube Slides.

The Truss Corner component of Truss in a Box is illustrated in FIG. 18. The Truss Corner consists of a Building Block (220) of Element 4, a Tubing Fastener (30) for Element 3, three sections of tubing (100, 110) for Element 1, and a screw (102) for Element 2. The Building Block (220) has a hole (220c) that extends from side 220a to side 220b. This hole (220c) is for insertion of the screw (102) through the Building Block (220) into the Tubing Fastener (30) to secure the round tube (100) to the Building Block (220). The angle of the hole (220c) in the Building Block (220) can differ according to the needs of the desired structure. The Building Block (220) used in this example also has two Tube Slides (221) for connection of the Building Block (220) to the square tubing (110).

The Cube End component of Truss in a Box is illustrated in FIG. 20. The Cube End consists of a Building Block (240) for Element 4, three sections of tubing (100, 110) for Element 1, a Tubing Fastener for Element 3 and a screw for Element 2. The Building Block (240) has a hole (240c) that extends through the Building Block for insertion of a screw (102) into the Tubing Fastener (30) and tubing (100). In this example, the Building Block (240) has two tube slides (241) for connection of the Building Block (240) to the square tubing (110).

The overall shape of Truss in a Box is illustrated in FIG. 21, showing how the Corner Cube (301), Center Cube (302), Truss Corner (303), and Cube End (304) fit together.

Figure 22:
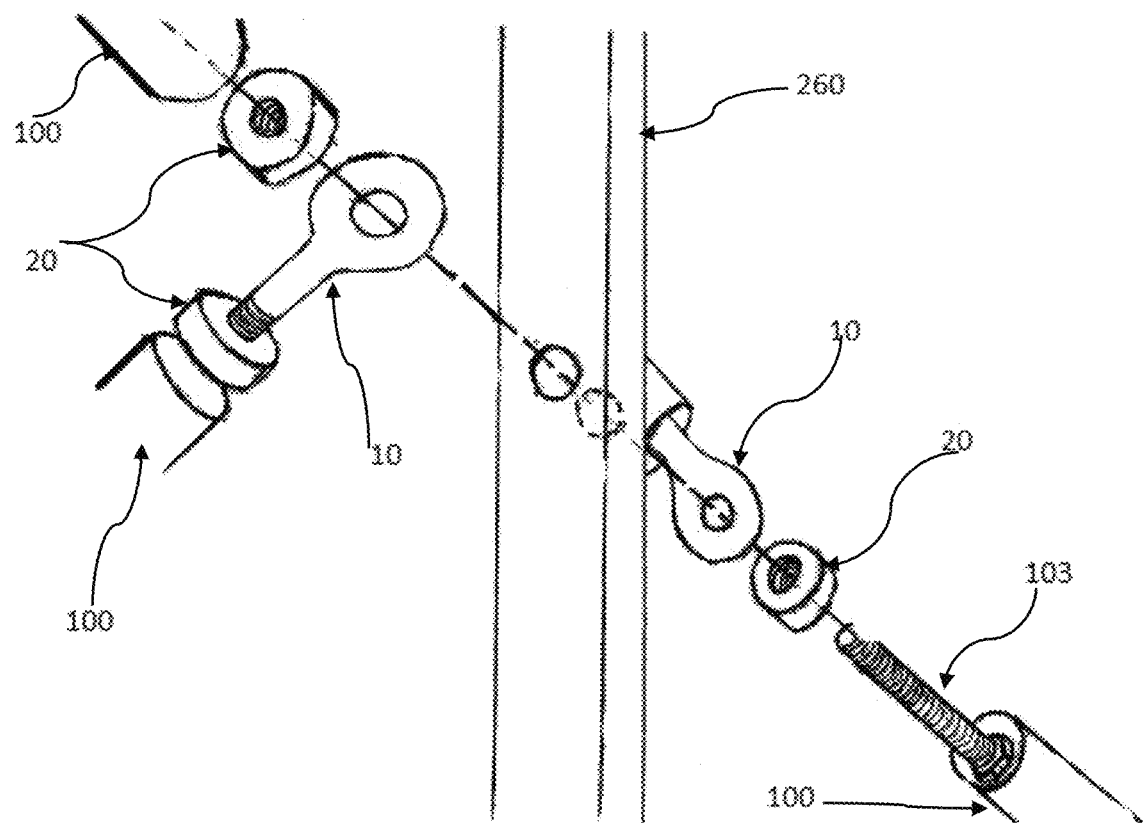
FIG. 22 illustrates an example of the use of the Pivoting Axial Screw (10) connecting tubing (100) to a building block (260). The Pivoting Axial Screw (10) is connected to the building block (260) using a screw (103) and is further connected to additional tubing via the same screw (103) and a tubing fastener (20).

FIG. 22 illustrates the use of the Pivoting Axial Screw (10) to connect a Building Block (260) to tubing (100) via a tubing fastener (20). The head of the Pivoting Axial Screw (10) is connected to the Building Block (260) via screw (103) which further connects tubing (100) to the head of the Pivoting Axial Screw (10). The threaded shaft of the Pivoting Axial Screw (10) can then be inserted into other tubing fasteners (20) and tubing (100). The Pivoting Axial Screw can be used with tubing to create a truss with the corners of said truss using the Corner Cube connections discussed previously.

Elements 1 through 4 can be manufactured from a variety of materials such as plastic, steel, wood or other metal alloys. Any time multiple pieces are fastened together with a single screw in an STC framework, washers and nuts can be used as appropriate to further tighten them. Element 3 can be manufactured in a variety of sizes to accommodate differing sizes of pipe, tubing and screws.

The present invention described above and illustrated in the accompanying figures is visualized as one embodiment of the invention. It is envisioned that this invention may be embodied in many different forms and should not be construed as limited to the embodiments set forth herein. It will be understood by those skilled in the art that changes in forms and details may be made without departing from the spirit and scope of the present application.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a stricture or feature that is disposed "adjacent" another feature may have portions that overlap or underlie the adjacent feature.

The invention claimed is:

1. A system for the construction of elongated symmetrical frameworks, where said system is comprised of four elements; where the first element is an elongated symmetrical shaped solid or hollow construction member; the second element is a pivoting axial screw which consists of a flat screw head perpendicular to a threaded screw shaft, where said flat screw head can be laid flat against any desired surface and affixed to the desired surface via a nail or a screw through said flat screw head of the pivoting axial screw, the third element is a component designed to fasten the first element to other pieces where the third element has a hole that runs through a axial center of said third element; where one side of said hole of said third element is a concave recessed funnel-shaped portion sized to accommodate said flat screw head of said second element and a cylindrical portion that corresponds to said threaded screw shaft of said second element, where said cylindrical portion of the hole can have smooth walls or be threaded, and the fourth element are building blocks that the first element is fastened onto or through.

* * * * *